US011027750B2

(12) United States Patent
Victor

(10) Patent No.: US 11,027,750 B2
(45) Date of Patent: Jun. 8, 2021

(54) METHOD AND SYSTEM FOR ASSISTING DRIVERS TO DRIVE WITH PRECAUTION

(71) Applicant: Volvo Car Corporation, Gothenburg (SE)

(72) Inventor: Trent Victor, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 16/426,090

(22) Filed: May 30, 2019

(65) Prior Publication Data

US 2019/0367050 A1    Dec. 5, 2019

Related U.S. Application Data

(60) Provisional application No. 62/679,047, filed on Jun. 1, 2018.

(51) Int. Cl.
*B60W 50/16*    (2020.01)
*B60W 30/095*   (2012.01)
(Continued)

(52) U.S. Cl.
CPC ........ *B60W 50/16* (2013.01); *B60W 30/0956* (2013.01); *B60W 40/08* (2013.01); *G06K 9/00805* (2013.01); *B60W 2040/0818* (2013.01)

(58) Field of Classification Search
CPC .. B60W 50/14; B60W 50/16; B60W 50/0098; B60W 30/08; A61B 5/7264;
(Continued)

(56) References Cited

U.S. PATENT DOCUMENTS 6,356,812 B1   3/2002 Cragun
8,725,311 B1 * 5/2014 Breed .................... A61B 5/163
                                                  701/1
(Continued)

FOREIGN PATENT DOCUMENTS

DE    2012112802 A1   6/2014
WO    2016169585 A1   10/2016
WO    2017052493 A1   3/2017

OTHER PUBLICATIONS

Nov. 22, 2018 European Search Report issue on International Application No. EP18175469.

(Continued)

*Primary Examiner* — Hoi C Lau
(74) *Attorney, Agent, or Firm* — Clements Bernard Walker; Christopher L. Bernard

(57) ABSTRACT

A method and system operable for detecting and adequately warning a driver that is determined to be of a unique out-of-the-loop class of drivers that mistakenly believe that a road vehicle operating in a driver-assist or self-driving (i.e., piloted-driving) mode will automatically identify and react to a perceived or sudden threat. A method and system operable for detecting and adequately warning an inattentive, drowsy, and/or out-of-the-loop driver and assessing and confirming the driver's adequate response to the associated warning prompt(s), which may include audio, visual, haptic, and, more preferably, brake pulse or the like warning prompt(s).

18 Claims, 4 Drawing Sheets

(51) Int. Cl.
*B60W 40/08* (2012.01)
*G06K 9/00* (2006.01)

(58) Field of Classification Search
CPC ........... A61B 5/163; A61B 5/18; A61B 5/746; B60R 16/0231; B60R 16/0232; B60R 16/0233; B60R 16/0234; G07C 5/0808; G07C 5/08; G06K 9/00885
See application file for complete search history.

(56) References Cited

U.S. PATENT DOCUMENTS

| | | | | |
|---|---|---|---|---|
| 8,965,037 B2* | 2/2015 | Levin | ..................... | A61B 5/163 382/100 |
| 9,928,432 B1* | 3/2018 | Sathyanarayana | ........................... | G06K 9/00335 |
| 10,232,861 B2* | 3/2019 | Huang | .................. | B60W 50/14 |
| 10,268,909 B2* | 4/2019 | Sathyanarayana | ... | G05D 1/0088 |
| 10,363,945 B2* | 7/2019 | Huang | .................. | B60W 50/16 |
| 10,762,785 B1* | 9/2020 | Dewey | .................. | G08G 1/0112 |
| 10,762,786 B1* | 9/2020 | Dewey | .................. | B62D 15/0265 |
| 2002/0091473 A1* | 7/2002 | Gardner | ............... | G07C 5/0808 701/32.7 |
| 2002/0116156 A1* | 8/2002 | Remboski | ............ | G07C 5/0808 702/188 |
| 2002/0120371 A1* | 8/2002 | Leivian | ............... | B60R 16/0231 701/1 |
| 2002/0120374 A1* | 8/2002 | Douros | ................ | G07C 5/0808 701/34.4 |
| 2002/0151297 A1* | 10/2002 | Remboski | ........... | B60R 16/0231 455/414.1 |
| 2003/0181822 A1* | 9/2003 | Victor | ....................... | A61B 5/18 600/558 |
| 2004/0239509 A1* | 12/2004 | Kisacanin | ............. | G01S 13/867 340/575 |
| 2005/0030184 A1* | 2/2005 | Victor | .................... | B60K 28/06 340/576 |
| 2005/0073136 A1* | 4/2005 | Larsson | .................. | A61B 5/18 280/735 |
| 2006/0287779 A1* | 12/2006 | Smith | ................ | G06K 9/00604 701/1 |
| 2008/0042813 A1* | 2/2008 | Wheatley | ............... | G08G 1/166 340/435 |
| 2010/0033333 A1* | 2/2010 | Victor | ................ | G06K 9/00845 340/576 |
| 2011/0169625 A1* | 7/2011 | James | .................... | B60Q 9/008 340/439 |
| 2013/0058529 A1* | 3/2013 | Levin | .................... | B60K 28/066 382/103 |
| 2014/0139655 A1* | 5/2014 | Mimar | ................... | G08B 21/06 348/77 |
| 2014/0168399 A1* | 6/2014 | Plummer | ................. | B60Q 9/00 348/78 |
| 2015/0262484 A1* | 9/2015 | Victor | .................... | G09B 19/16 701/1 |
| 2015/0314681 A1* | 11/2015 | Riley, Sr. | ............. | A61B 5/7455 340/576 |
| 2016/0068103 A1 | 3/2016 | Mcnew et al. | | |
| 2016/0180677 A1* | 6/2016 | Reed | ....................... | H04W 4/12 340/576 |
| 2016/0267335 A1* | 9/2016 | Hampiholi | .............. | G06F 3/013 |
| 2017/0120749 A1* | 5/2017 | Dias | .................... | B60K 28/066 |
| 2018/0043906 A1* | 2/2018 | Huang | .................. | B60W 50/14 |
| 2018/0075309 A1* | 3/2018 | Sathyanarayana | ..... | H04N 5/247 |
| 2018/0099679 A1* | 4/2018 | Huang | .................. | B60W 50/16 |
| 2018/0165531 A1* | 6/2018 | Sathyanarayana | ..... | H04N 5/247 |
| 2018/0244279 A1* | 8/2018 | Kochhar | ............... | B60W 30/08 |
| 2018/0285665 A1* | 10/2018 | Paszkowicz | ...... | B60W 50/0098 |
| 2019/0122525 A1* | 4/2019 | Lancelle | ................ | A61B 5/746 |
| 2019/0213429 A1* | 7/2019 | Sicconi | ............. | G06K 9/00845 |
| 2019/0367016 A1* | 12/2019 | Brannstrom | .......... | B60Q 9/008 |
| 2019/0367050 A1* | 12/2019 | Victor | .................. | B60W 50/16 |

OTHER PUBLICATIONS

Oct. 21, 2019 Extended European Search Report issued on International Application No. 19177268.

Carsten et al., "How can humans understand their automated cars?HMI principles, problems and solutions",Article, Sep. 1, 2017, Published Online May 12, 2018, pp. 1-18.

* cited by examiner

METHOD AND SYSTEM FOR ASSISTING DRIVERS TO DRIVE WITH PRECAUTION

CROSS-REFERENCE TO RELATED APPLICATION

The present disclosure claims the benefit of priority of U.S. Provisional Patent Application No. 62/679,047, filed on Jun. 1, 2018, and entitled "METHOD AND SYSTEM FOR ASSISTING DRIVERS TO DRIVE WITH PRECAUTION," the contents of which are incorporated in full by reference herein for all purposes.

TECHNICAL FIELD

The present disclosure relates generally to a method for assisting a driver of a host vehicle to drive with precaution. It also relates to a system for assisting a driver of a host vehicle to drive with precaution, as well as a road vehicle comprising such a system.

BACKGROUND

Modern road vehicles are equipped with an increasing amount of exterior sensors and communication devices in order to be able to collect information about their surroundings. Examples of such exterior sensors are radar and camera sensors that monitor traffic in front of a road vehicle, such that a driver of the vehicle can be assisted in avoiding intersection and rear-end collisions, for example.

Previous systems for assisting road vehicle drivers in keeping a high level of attention have primarily focused on detection and warnings for driver eyes off-road/driver-distraction situations. Such systems have usually been designed to either warn a driver of a road vehicle if the eyes off-road time exceeds a limit or to trigger warnings for threats at a low threat-level if the driver of the road vehicle is distracted.

Such existing solutions sometimes suffer some drawbacks while driving a road vehicle in a manual or supervised automation-mode. This is as a low level of driver-attention does not always imply a high level of risk. Warning a driver of a road vehicle of low attention levels may lead to unnecessary warnings if a traffic situation is considered as safe even with a low level of driver-attention. However, threats may also suddenly appear at any time while a driver is distracted, which can make it difficult to warn the driver in due time once a threat is detected.

To overcome this problem, solutions have been proposed to combine driver-monitoring cameras with exterior sensing-systems to warn the driver of a road vehicle if it is assessed that the driver has not perceived a threat which has been detected by an exterior sensing-system. These types of solutions can be used to reduce the number of unnecessary warnings, but they may however also lead to situations with late or missed warnings, e.g. due to occluded threats, such as pedestrians that walk out from an obscured area from which the exterior sensing-systems are unable to obtain sufficient information.

Thus, there is a need for improved solutions for assisting road vehicle drivers in avoiding accidents, especially while driving in manual or supervised automation modes.

Further, there is a need for an improved solution for detecting and adequately warning a driver that is determined to be of a unique class of drivers that mistakenly believe that a road vehicle operating in a driver-assist or self-driving (i.e., piloted-driving) mode will automatically identify and react to a perceived or sudden threat. This is referred to as an "out-of-the-loop" driver. This situation requires a systematic analysis and classification of the behavior of a given driver and a higher level of coaching and warnings for this unique class of drivers.

Still further, there is a need for an improved solution for detecting an adequately warning an inattentive, drowsy, and/or out-of-the-loop driver and assessing and confirming the driver's adequate response to the associated warning prompt(s), which may include audio, visual, haptic, and, more preferably, brake pulse or the like warning prompt(s). This situation requires a modeling of reaction times and a consideration of time-to-collision probabilities once a perceived or sudden threat has been identified.

SUMMARY

An object of the present invention is to provide an improved method for assisting drivers of road vehicles in avoiding accidents while driving in manual or supervised automation modes.

This is provided by a method for assisting a driver of a host vehicle to drive with precaution, the method comprising: determining, from one or more host vehicle sensors arranged to monitor the environment of the host vehicle, other road users and at least one particular feature associated with a traffic situation of the host vehicle; applying at least one hypothesis related to at least one hypothetical threat that may arise based on the determined other road users and the at least one particular feature; setting or estimating, based on the applied at least one hypothesis, a host vehicle driver level of attention required to handle the at least one hypothetical threat and estimating a time until that host vehicle driver level of attention will be required; deriving, from one or more driver-monitoring sensors of the host vehicle, a current host vehicle driver level of attention; determining if the set or estimated required host vehicle driver level of attention exceeds the current host vehicle driver level of attention and if the estimated time until the estimated host vehicle driver level of attention will be required is less than a threshold-time, and if so determined produce at least one of visual, acoustic and haptic information to a host vehicle driver environment, to promote increased host vehicle driver-attention to the at least one hypothetical threat, and/or triggering at least one of automated braking and steering of the host vehicle, to promote an increase in safety margin to the at least one hypothetical threat.

In a further embodiment the method further comprises: deriving, by the one or more driver-monitoring sensors of the host vehicle, at least one of a gaze-direction and head-pose of a driver of the host vehicle; and determining, from the derived gaze-direction and/or head-pose, if a host vehicle driver is attentive in a direction of the at least one hypothetical threat and if so determined reducing the threshold-time compared to if derived that the attention is not in a direction of the at least one hypothetical threat.

In a yet further embodiment the method further comprises estimating the time until the estimated host vehicle driver level of attention required to handle the at least one hypothetical threat will be required, accounting for a combined assumed capability of a driver of the host vehicle and a capability of one or more active safety systems of the host vehicle.

In a still further embodiment the method comprises deriving an approximation of the time until the estimated host vehicle driver level of attention will be required through introducing hypothetical future behavior models to all determined road users as well as to all hypothetical threats related to potentially hidden road users associated with the traffic situation of the host vehicle.

In an additional embodiment the method further comprises determining the at least one particular feature associated with a traffic situation of the host vehicle as a feature associated with at least one of a pedestrian, another vehicle, a crossing, an animal, another road user or element of infrastructure.

In yet an additional embodiment the method further comprises producing the at least one of visual, acoustic or haptic information to a host vehicle driver environment, to promote increased host vehicle driver-attention in a direction from which the at least one hypothetical threat may arise, if the estimated time remaining until the estimated host vehicle driver level of attention is required is less than the threshold-time.

In still yet an additional embodiment the method further comprises estimating the time until the estimated host vehicle driver level of attention required to handle the at least one hypothetical threat will be required using a driver model with estimated reaction times for different potential threats.

Furthermore, here envisaged is a system for assisting drivers of road vehicles in avoiding accidents while driving in manual or supervised automation modes.

This is provided by a system for assisting a driver of a host vehicle to drive with precaution, the system comprising at least one processing device programmed to: determine, from one or more host vehicle sensors arranged to monitor the environment of the host vehicle, other road users and at least one particular feature associated with a traffic situation of the host vehicle; apply at least one hypothesis related to the at least one hypothetical threat that may arise based on the determined other road users and the at least one particular feature; set or estimate, based on the applied at least one hypothesis, a host vehicle driver level of attention required to handle the at least one hypothetical threat and estimate a time until that host vehicle driver level of attention will be required; derive, from one or more driver-monitoring sensors of the host vehicle, a current host vehicle driver level of attention; determine if the set or estimated required host vehicle driver level of attention exceeds the current host vehicle driver level of attention and if the estimated time until the estimated host vehicle driver level of attention will be required is less than a threshold-time, and if so determined produce at least one of visual, acoustic and haptic information to a host vehicle driver environment, to promote increased host vehicle driver-attention to the at least one hypothetical threat, and/or trigger at least one of automated braking and steering of the host vehicle, to promote an increase in safety margin to the at least one hypothetical threat.

In a further embodiment of the system the at least one processing device is further programmed to: derive, by the one or more driver-monitoring sensors of the host vehicle, at least one of a gaze-direction and head-pose of a driver of the host vehicle; and determine, from the derived gaze-direction and/or head-pose, if a host vehicle driver is attentive in a direction of the at least one hypothetical threat and if so determined to reduce the threshold-time compared to if derived that the attention is not in a direction of the at least one hypothetical threat.

In a yet further embodiment of the system the at least one processing device is further programmed to estimate the time until the estimated host vehicle driver level of attention required to handle the at least one hypothetical threat will be required, accounting for a combined assumed capability of a driver of the host vehicle and a capability of one or more active safety systems of the host vehicle.

In an additional embodiment of the system the at least one processing device is further programmed to derive an approximation of the time until the estimated host vehicle driver level of attention will be required through introducing hypothetical future behavior models to all determined road users as well as to all hypothetical threats related to potentially hidden road users associated with the traffic situation of the host vehicle.

In still an additional embodiment of the system the at least one processing device is further programmed to determine the at least one particular feature associated with a traffic situation of the host vehicle as a feature associated with at least one of a pedestrian, another vehicle, a crossing, an animal, another road user or element of infrastructure.

In yet an additional embodiment of the system the at least one processing device is further programmed to produce the at least one of visual, acoustic or haptic information to a host vehicle driver environment, to promote increased host vehicle driver-attention in a direction from which the at least one hypothetical threat may arise, if the estimated time remaining until the estimated host vehicle driver level of attention is required is less than the threshold-time.

In still yet an additional embodiment of the system the at least one processing device is further programmed to estimate the time until the estimated host vehicle driver level of attention required to handle the at least one hypothetical threat will be required using a driver model with estimated reaction times for different potential threats.

In still yet an additional embodiment, the method and system are operable for detecting and adequately warning a driver that is determined to be of a unique out-of-the-loop class of drivers that mistakenly believe that a road vehicle operating in a driver-assist or self-driving (i.e., piloted-driving) mode will automatically identify and react to a perceived or sudden threat. This situation requires a systematic analysis and classification of the behavior of a given driver and a higher level of coaching and warnings for this unique class of drivers. Of note, this out-of-the-loop detection may also be referred to as the "estimation of a predicted driver response to a crash situation" from patterns of behavior preceding a crash or "automation expectation mismatch" detection.

In still yet an additional embodiment, the method and system are operable for detecting and adequately warning an inattentive, drowsy, and/or out-of-the-loop driver and assessing and confirming the driver's adequate response to the associated warning prompt(s), which may include audio, visual, haptic, and, more preferably, brake pulse or the like warning prompt(s). This situation requires a modeling of reaction times and a consideration of time-to-collision probabilities once a perceived or sudden threat has been identified.

The present disclosure provides a method for assisting a driver of a host vehicle to drive with precaution, the method including: determining from one or more host vehicle sensors or cameras arranged to monitor an environment of the host vehicle other road users and at least one particular feature associated with a traffic situation of the host vehicle; applying at least one hypothesis related to at least one hypothetical threat that may arise based on the determined other road users and the at least one particular feature; analyzing an out-of-the-loop condition of the host vehicle driver based on one or more of host vehicle driver eye movement, host vehicle driver activity, host vehicle equipment sensor data, and host vehicle driver periods of attention and inattention over a period of time; setting or estimating, based on the applied at least one hypothesis and the out-of-the-loop condition, a host vehicle driver level of attention threshold required to handle the at least one hypothetical threat and estimating a time until that host vehicle driver level of attention will be required; deriving, from one or more host vehicle driver-monitoring sensors of the host vehicle, a current host vehicle driver level of attention; determining if the set or estimated required host vehicle driver level of attention threshold exceeds the current host vehicle driver level of attention; and, if the set or estimated required host vehicle driver level of attention threshold exceeds the current host vehicle driver level of attention, producing at least one of a visual, acoustic, haptic information, and brake impulse prompt to a host vehicle driver environment to promote increased host vehicle driver-attention to the at least one hypothetical threat and/or triggering at least one of automated braking and steering of the host vehicle to promote an increase in safety margin to the at least one hypothetical threat. The method further includes monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, providing at least one of an enhanced visual, acoustic, haptic information, and brake impulse prompt to the host vehicle driver.

The present disclosure further provides a system for assisting a driver of a host vehicle to drive with precaution, the method including: an on-board processor executing an algorithm for determining from one or more host vehicle sensors or cameras arranged to monitor an environment of the host vehicle other road users and at least one particular feature associated with a traffic situation of the host vehicle; an on-board processor executing an algorithm for applying at least one hypothesis related to at least one hypothetical threat that may arise based on the determined other road users and the at least one particular feature; an on-board processor executing an algorithm for analyzing an out-of-the-loop condition of the host vehicle driver based on one or more of host vehicle driver eye movement, host vehicle driver activity, host vehicle equipment sensor data, and host vehicle driver periods of attention and inattention over a period of time; an on-board processor executing an algorithm for setting or estimating, based on the applied at least one hypothesis and the out-of-the-loop condition, a host vehicle driver level of attention threshold required to handle the at least one hypothetical threat and estimating a time until that host vehicle driver level of attention will be required; an on-board processor executing an algorithm for deriving, from one or more host vehicle driver-monitoring sensors of the host vehicle, a current host vehicle driver level of attention; an on-board processor executing an algorithm for determining if the set or estimated required host vehicle driver level of attention threshold exceeds the current host vehicle driver level of attention; and an on-board processor executing an algorithm for, if the set or estimated required host vehicle driver level of attention threshold exceeds the current host vehicle driver level of attention, producing at least one of a visual, acoustic, haptic information, and brake impulse prompt to a host vehicle driver environment to promote increased host vehicle driver-attention to the at least one hypothetical threat and/or triggering at least one of automated braking and steering of the host vehicle to promote an increase in safety margin to the at least one hypothetical threat. The system further includes an on-board processor executing an algorithm for monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, providing at least one of an enhanced visual, acoustic, haptic information, and brake impulse prompt to the host vehicle driver.

Also, here envisaged is a road vehicle comprising a system for assisting a driver of a host vehicle to drive with precaution as described herein.

The above embodiments have the beneficial effects of being able to assist a driver of a road vehicle in keeping a level of attention required by a traffic situation with respect to different threats, detectable as well as occluded, that may arise.

BRIEF DESCRIPTION OF THE DRAWINGS

In the following, embodiments herein will be described in greater detail by way of example only with reference to attached drawings, in which.

DESCRIPTION OF EMBODIMENTS

In the following will be described some example embodiments of a method and system for using information collected from road vehicle exterior sensing-systems with at least one road vehicle driver-monitoring sensor, e.g. camera-sensor, to assist road vehicle drivers in driving with precaution in traffic situations where a high level of attention is required.

Embodiments herein thus aim to assist a driver of a road vehicle in keeping a level of attention which is required by the situation with respect to different risks that may arise. In some situations, the required level of attention is low, whereas other situations require a higher level of attention.

Figure 1:
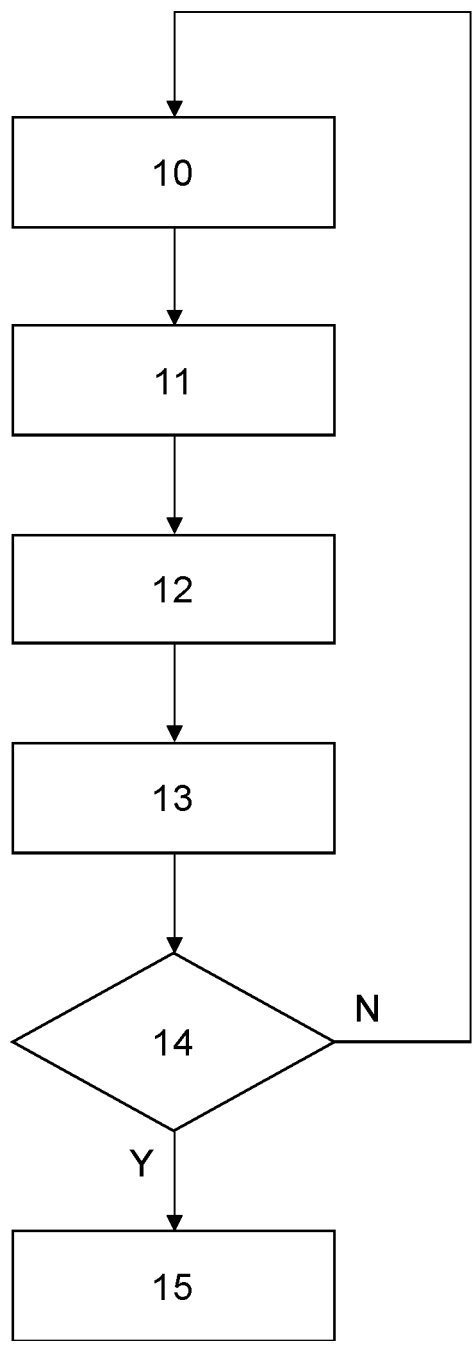
FIG. 1 illustrates schematically a method for assisting a driver of a host vehicle to drive with precaution according to an example embodiment.

The proposed method for assisting a driver of a host vehicle 1 to drive with precaution is illustrated schematically in FIG. 1 and comprises determining 10, from one or more host vehicle sensors 3a, 3b arranged to monitor the environment of the host vehicle 1, other road users and at least one particular feature associated with a traffic situation of the host vehicle 1. Thus, it is assumed that the host vehicle 1 is equipped with one or more sensors 3a, 3b, e.g. camera, lidar or radar based sensors or fusions of these, by which surrounding objects can be detected and their positions and velocities relative to the host vehicle determined as well as features associated with a traffic situation of the host vehicle 1 determined.

At least one hypothesis, related to at least one hypothetical threat that may arise based on the determined other road users and the at least one particular feature, is applied 11. Such hypothetical threats include occluded threats, such as pedestrians that might walk out from an obscured area from which the exterior sensing-systems 3$a$, 3$b$ are unable to obtain sufficient information, e.g. pedestrians that might walk out from behind a parked vehicle or other obstacle.

It is therefore proposed, according to a general embodiment of the method, to estimate 12 the time remaining until a driver of a road vehicle 1 might have to take a defensive driving action, such as reducing the speed or increasing the lateral margin when passing e.g. a vehicle which is parked next to the road. Estimating the time remaining until a high level of attention is required can be done by introducing "what ifs" to all road users and potentially hidden road users in the environment. Thus, based on the applied at least one hypothesis, a host vehicle driver level of attention required to handle the at least one hypothetical threat is set or estimated and a time until that host vehicle driver level of attention will be required is estimated. Thus, as an alternative to using a fixed pre-set host vehicle driver level of attention required to handle a hypothetical threat such a required driver level of attention may also be estimated. The required driver level of attention may be different for different types of threats, which may be reflected through setting different fixed host vehicle driver level of attention values for different hypothetical threats or through different estimates based on different hypothetical threats.

A current host vehicle driver level of attention is derived 13 from one or more driver-monitoring sensors 4 of the host vehicle 1. Such a current host vehicle driver level of attention can e.g. be derived from gaze-directions and head-poses of a driver of the host vehicle determined by the one or more driver-monitoring sensors 4 of the host vehicle 1. The one or more driver-monitoring sensors 4 may e.g. comprise one or more driver-monitoring cameras and/or other types of sensors for monitoring driver behavior, such as e.g. sensors for monitoring driver interaction with a control panel, such as a touch-screen display or similar.

In accordance with the proposed method is also determined 14 if the set or estimated required host vehicle driver level of attention exceeds the current host vehicle driver level of attention and if the estimated time until the estimated host vehicle driver level of attention will be required is less than a threshold-time $t_{thres}$. The threshold-time $t_{thres}$ is a sum of an estimated reaction time of a driver to become attentive and a reaction time to respond to a situation that may arise.

If determined that the estimated required host vehicle driver level of attention exceeds the current host vehicle driver level of attention and that the time until the estimated host vehicle driver level of attention will be required is less than the threshold-time $t_{thres}$, according to the proposed method, there should be produced 15 at least one of visual, acoustic and haptic information to a host vehicle driver environment. Hence, if the time remaining until a high level of attention is required is less than the threshold-time $t_{thres}$, a driver shall be encouraged to keep a high level of attention. Such information should be provided to promote increased host vehicle driver-attention to the at least one hypothetical threat. As an alternative or complement thereto, according to the proposed method, at least one of automated braking and steering of the host vehicle should be triggered. Such automated braking and/or steering of the host vehicle should thus be triggered to promote an increase in safety margin to the at least one hypothetical threat.

Thus, if there is a hypothetical threat for which, given the current host vehicle 1 speed, a driver need to have a high level of attention e.g. 1 to 2 seconds in advance to a critical point/time where an evasive action might have to be initiated then a distracted driver will need to be alerted in time to respond to the warning and achieve a high level of attention at this critical point in time. The time of 1 to 2 seconds in advance is the time which is needed by a driver to perceive and react to the situation. The critical point/time where an evasive action might have to be initiated may e.g. be due to approaching a traffic light, a location where pedestrians frequently cross the road or to overtaking a vehicle that may change lane into the host vehicle 1 lane.

Depending on the level of driver distraction, the warning shall hence be given to a driver in time to react to the warning and reach a high level of attention before the critical point in time. For a driver that is already attentive, no warning is needed, whereas for a distracted driver a warning shall be given e.g. 1 to 3 seconds before the critical point in time, depending on the level of distraction. To sum up, the driver need to be alerted 2 to 5 seconds before the critical point, or the speed of the host vehicle need to be reduced and/or the lateral position need to be adjusted to move the critical point forward in time. The critical point in turn may depend on the ability of the driver and/or the combined ability of the driver and ADAS systems to deal with the hypothetical threat. Which hypothetical threats that a driver should be alerted for and how the alert or speed reduction should be designed is a matter of choice for a system designer. Typically, a system designer might want to alert more frequently and earlier for hypothetical threats that are highly probable and later for threats that are less probable in the current traffic situation. Hypothetical threats can be applied both to observed objects and to obscured areas where objects and road users might be hidden. The probability of a threat event may in turn be estimated online/offline using environmental sensors and/or statistics from naturalistic driving data and accident data.

Visual information may be provided to a host vehicle driver environment using one or more display units 5, indicator lights or similar. Acoustic information may be provided to a host vehicle driver environment using one or more loudspeakers 6, buzzers or similar. Haptic information may be provided to a host vehicle driver environment e.g. using one or more vibrating arrangements 7, arranged to provided vibrations to a steering wheel, pedals or driver seat of the vehicle 1 or using a braking system 8 of the vehicle to produce brake pulses, which have been proven very effective when it comes to alerting a driver.

Automated braking of the host vehicle 1 may be accomplished using a braking system 8 thereof and automated steering of the host vehicle 1 may be accomplished using a steering assist system 9 thereof.

Thus, as shown above, a vehicle 1 operating in accordance with the proposed method may optionally be designed to automatically reduce the speed or increase the lateral margin to the potential threat to increase the time remaining until a high level of attention is required if a driver does not increase his/her level of attention despite the visual, acoustic and haptic stimuli provided to encourage paying attention. Moreover, the speed may optionally also be reduced automatically, if it is judged that the speed is so high that even a high level of attention is not sufficient to drive safely in the current traffic situation.

Utilising the proposed method a road vehicle driver should be assisted in having a sufficient level of attention: to ensure that collisions can be avoided/mitigated with pedestrians that might walk out from behind a parked vehicle, using evasive steering/braking actions; to ensure that collisions with a lead vehicle can be avoided with evasive steering/braking actions in case the lead vehicle suddenly brakes hard; to ensure that the vehicle 1 can be brought to a full stop before entering an intersection in case a traffic light switches to red; or to ensure that collisions can be avoided with crossing traffic when driving through an intersection.

In short, the solution according to the proposed method serves to alert a driver and/or reduce the speed/steer in advance when precautionary measures are needed and/or if the required level of attention soon will be very high. Alerts/information to encourage speed reduction and/or keeping a high attention level can be designed in many ways well known to the skilled person and are thus not described further herein.

Optionally the method further comprises deriving, by the one or more driver-monitoring sensors 4 of the host vehicle 1, at least one of a gaze-direction and head-pose of a driver of the host vehicle 1. Such a driver-monitoring sensor 4 may e.g. be an interior camera that is arranged for deriving gaze and head-pose of a driver of a road vehicle 1, such that a viewing direction of the driver can be determined. From the derived gaze-direction and/or head-pose is determined if a host vehicle driver is attentive in a direction of the at least one hypothetical threat. If determined that the host vehicle driver is attentive in the direction of the at least one hypothetical threat, the threshold-time $t_{thres}$ can be reduced compared to if derived that the attention is not in a direction of the at least one hypothetical threat. Furthermore, if the estimated time remaining until a high level of attention is less than the threshold-time $t_{thres}$, a driver may be encouraged, e.g. by the visual, acoustic and haptic stimuli provided to keep a high level of attention in the direction from which the threat may arise.

The method may optionally also be designed to provide for estimating when a high level of attention is required when accounting for the combined capability of a driver and active safety systems installed in the vehicle 1, not only the capability of a driver. Thus, in further embodiment the method comprises estimating the time until the estimated host vehicle driver level of attention required to handle the at least one hypothetical threat will be required, accounting for a combined assumed capability of a driver of the host vehicle and a capability of one or more active safety systems of the host vehicle. Active safety systems are commonly provided to road vehicles to help drivers thereof avoid accidents or to mitigate the consequences thereof. Such active safety systems may include one or more of; an anti-lock braking system (ABS); an electronic stability system (ESP); an active lane-keeping system; an active blind-spot system; a speed-limit system; a distance-keeping system; an attention-assist system and other active safety arrangements in the road vehicle 1 for avoiding or mitigating collisions with other road users.

In a still further embodiment the method comprises deriving an approximation of the time until the estimated host vehicle driver level of attention will be required through introducing hypothetical future behavior models to all determined road users as well as to all hypothetical threats related to potentially hidden road users associated with the traffic situation of the host vehicle 1. The hypothetical future behavior models can be likened to introducing hypothetical "what ifs" to all road users and potentially hidden road users in the traffic environment of the host vehicle. This can e.g. be done through assigning to a pedestrian a hypothetical future behavior model comprising that the pedestrian will enter the road from a position partially or fully obscured by a parked roadside vehicle. Thus, assisting a driver of the host vehicle 1 in keeping a level of attention which is required by the situation with respect to different risks that may arise is based on an assessment that is made with respect to when the driver's attention is required, derived by introducing— "what if this road user behaves in this way?"—to all road users and potentially hidden road users in the traffic environment.

In an additional embodiment the method further comprises determining the at least one particular feature associated with a traffic situation of the host vehicle 1 as a feature associated with at least one of a pedestrian, another vehicle, a crossing, a traffic light, an animal or another road user or element of infrastructure in the vicinity of the host vehicle.

Previous research has shown that road vehicle drivers are able avoid most types of accidents if they have a high level of attention at least two seconds before a critical situation arise. Thus, in yet an additional embodiment the method further comprises producing the at least one of visual, acoustic or haptic information to a host vehicle driver environment, to promote increased host vehicle driver-attention in a direction from which the at least one hypothetical threat may arise, if the estimated time remaining until the estimated host vehicle driver level of attention is required is less than the threshold-time $t_{thres}$. The direction from which the at least one hypothetical threat may arise may thus be indicated visually, e.g. using arrows pointing thereto or indicators placed to indicate different threat directions or similar, acoustic, e.g. by synthesizing a warning seemingly originating from the direction of the threat, or haptic, e.g. by causing vibrations to a host vehicle driver environment in the general direction of the threat.

However, it should be noted that in some situations, defensive steering/braking actions by the host vehicle 1 may be continuously required, e.g. during the last two seconds when passing a stationary vehicle where pedestrians suddenly might appear from an obscured area at any point in time.

The method may optionally also be designed to provide for individually estimating when a high level of attention is required using a driver model with estimated individual reaction times for different potential threats, lighting, weather, and road conditions and threat looming rates and similar. Thus, in still yet an additional embodiment the method further comprises estimating the time until the estimated host vehicle driver level of attention required to handle the at least one hypothetical threat will be required using a driver model with estimated reaction times for different potential threats.

Figure 2:
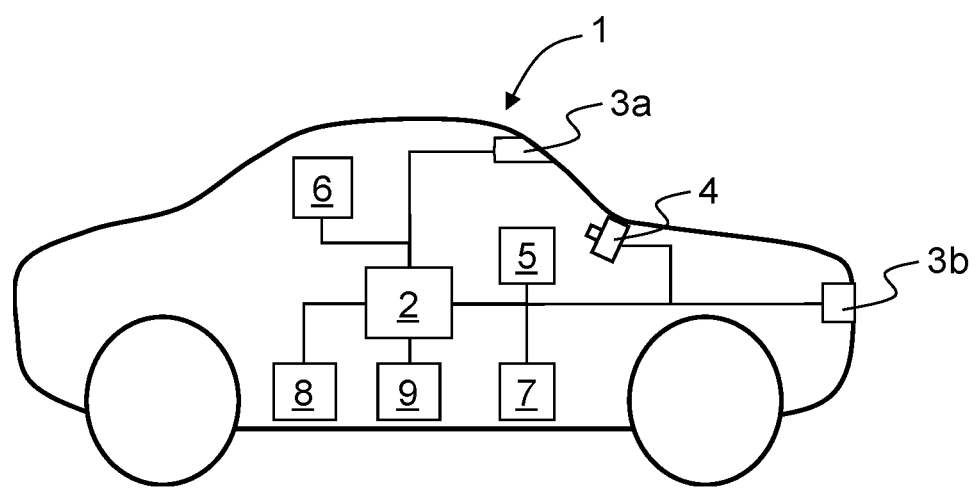
FIG. 2 illustrates schematically a system for assisting a driver of a host vehicle to drive with precaution according to an example embodiment.

Furthermore, here envisaged is an improved system, as illustrated schematically in FIG. 2, for assisting a driver of a host vehicle 1 to drive with precaution and assisting drivers in avoiding accidents while driving in manual or supervised automation mode.

The proposed system comprises at least one processing device 2 programmed to determine, from one or more host vehicle sensors 3a, 3b, e.g. camera, lidar, or radar-based sensors or fusions of these, arranged to monitor the environment of the host vehicle 1 other road users and at least one particular feature associated with a traffic situation of the host vehicle 1.

The at least one processing device 2 is also programmed to apply at least one hypothesis related to the at least one hypothetical threat that may arise based on the determined other road users and the at least one particular feature. Hypothetical threats include occluded threats, such as pedestrians that might walk out from an obscured area from which the exterior sensing-systems 3a, 3b are unable to obtain sufficient information, e.g. pedestrians that might walk out from behind a parked vehicle or other obstacle. Threats may arise in front of the host vehicle 1 as well as from the rear and a side thereof, e.g. when driving through or turning at a crossing.

The at least one processing device 2 is further programmed to set or estimate, based on the applied at least one hypothesis, a host vehicle driver level of attention required to handle the at least one hypothetical threat and to estimate a time until that host vehicle driver level of attention will be required. Hereby the time remaining until a driver of a road vehicle 1 might have to take a defensive driving action, such as reducing the speed or increasing the lateral margin when passing e.g. a vehicle which is parked next to the road can be estimated. This is done through introducing hypotheses of a "what if" kind to all road users and potentially hidden road users in the environment, i.e. "what if this road user behaves in this way?".

The at least one processing device 2 is further programmed to derive, from one or more driver-monitoring sensors 4 of the host vehicle, a current host vehicle driver level of attention. Such a current host vehicle driver level of attention can e.g. be derived from determined gaze-directions and head-poses of a driver of the host vehicle.

The at least one processing device 2 is further programmed to determine if the set or estimated required host vehicle driver level of attention exceeds the current host vehicle driver level of attention and if the estimated time until the estimated host vehicle driver level of attention will be required is less than a threshold-time $t_{thres}$.

If determined that the set or estimated required host vehicle driver level of attention exceeds the current host vehicle driver level of attention and that the estimated time until the estimated host vehicle driver level of attention will be required is less than the threshold-time $t_{thres}$, the at least one processing device 2 is further programmed to produce at least one of visual, acoustic and haptic information to a host vehicle driver environment.

Visual information is e.g. provided to a host vehicle driver environment using one or more display units 5, indicator lights or similar. Acoustic information is e.g. provided to a host vehicle driver environment using one or more loudspeakers 6, buzzers or similar. Haptic information is e.g. provided to a host vehicle driver environment e.g. using one or more vibrating arrangements 7, arranged to provided vibrations to a steering wheel, pedals or driver seat of the vehicle 1 or using a braking system 8 of the vehicle to produce brake pulses, which have been proven very effective when it comes to alerting a driver.

Automated braking of the host vehicle 1 is e.g. accomplished using a braking system 8 thereof and automated steering of the host vehicle 1 is e.g. accomplished using a steering assist system 9 thereof.

Hence, if the time remaining until a high level of attention is required is less than the threshold-time $t_{thres}$, the at least one processing device 2 is further programmed to encourage a driver to keep a high level of attention. Such information will thus be provided to promote increased host vehicle driver-attention to the at least one hypothetical threat. As an alternative or complement thereto, the at least one processing device 2 is further programmed to trigger at least one of automated braking and steering of the host vehicle 1. Such automated braking and/or steering of the host vehicle 1 will then be triggered to promote an increase in safety margin to the at least one hypothetical threat.

Thus, as shown above, a vehicle 1 equipped with the proposed system may optionally be designed to automatically reduce the speed or increase the lateral margin to the potential threat to increase the time remaining until a high level of attention is required if a driver does not increase his/her level of attention despite the visual, acoustic and haptic stimuli provided by the at least one processing device 2 to encourage paying attention. Moreover, the at least one processing device 2 may further optionally be programmed to reduce the speed automatically, if it is judged that the speed is so high that even a high level of attention is not sufficient to drive safely in the current traffic situation.

By the proposed system a driver of a road vehicle 1 equipped therewith will be assisted in having a sufficient level of attention: to ensure that collisions can be avoided/mitigated with pedestrians that might walk out from behind a parked vehicle, using evasive steering/braking actions; to ensure that collisions with a lead vehicle can be avoided with evasive steering/braking actions in case the lead vehicle suddenly brakes hard; to ensure that the vehicle 1 can be brought to a full stop before entering an intersection in case a traffic light switches to red; or to ensure that collisions can be avoided with crossing traffic when driving through an intersection.

Thus, the proposed system serves to alert a driver and/or reduce the speed/steer in advance when precautionary measures are needed and/or if the required level of attention soon will be very high. Alerts/information to encourage speed reduction and/or keeping a high attention level can be designed in many ways well known to the skilled person and are thus not elaborated further herein.

Optionally the at least one processing device 2 is further programmed to derive, by the one or more driver-monitoring sensors 4 of the host vehicle 1, at least one of a gaze-direction and head-pose of a driver of the host vehicle 1. As described above, such a driver-monitoring sensor 4 may e.g. be an interior camera that is arranged for deriving gaze and head-pose of a driver of a road vehicle 1, such that a viewing direction of the driver can be determined. The at least one processing device 2 is further also programmed to determine, from the derived gaze-direction and/or head-pose, if a host vehicle driver is attentive in a direction of the at least one hypothetical threat and if so determined to reduce the threshold-time $t_{thres}$ compared to if derived that the attention is not in a direction of the at least one hypothetical threat. Furthermore, if the estimated time remaining until a high level of attention is determined to be less than the threshold-time $t_{thres}$, the at least one processing device 2 may also be programmed to encourage a driver, e.g. by providing at least one of the visual, acoustic and haptic stimuli, to keep a high level of attention in the direction from which the threat may arise.

In further embodiments, the at least one processing device 2 is further programmed to estimate the time until the estimated host vehicle driver level of attention required to handle the at least one hypothetical threat will be required, accounting for a combined assumed capability of a driver of the host vehicle 1 and a capability of one or more active safety systems of the host vehicle 1, i.e. a combined capability of a driver and active safety systems installed in the vehicle 1, not only the capability of a driver.

Active safety systems are commonly provided to road vehicles to help drivers thereof avoid accidents or to mitigate the consequences thereof. Such active safety systems may include one or more of; an anti-lock braking system (ABS); an electronic stability system (ESP); an active lane keeping system; an active blind spot system; a speed limit system; a distance keeping system; an attention assist system and other active safety arrangements for avoiding or mitigating collisions with other road users.

In still further embodiments the at least one processing device 2 is further programmed to derive an approximation of the time until the estimated host vehicle driver level of attention will be required. This is done through introducing hypothetical future behavior models to all determined road users as well as to all hypothetical threats related to potentially hidden road users associated with the traffic situation of the host vehicle 1.

The hypothetical future behavior models can be likened to introducing hypothetical "what ifs" to all road users and potentially hidden road users in the traffic environment of the host vehicle 1. Thus, assisting a driver of the host vehicle 1 in keeping a level of attention which is required by the situation with respect to different risks that may arise based on an assessment that is made by the at least one processing device 2 with respect to when the driver's attention is required, derived by introducing —"what if this road user behaves in this way?"—to all road users and potentially hidden road users in the traffic environment.

In some additional embodiments the at least one processing device 2 is further programmed to determine the at least one particular feature associated with a traffic situation of the host vehicle 1 as a feature associated with at least one of a pedestrian, another vehicle, a crossing, an animal or another road user or element of infrastructure in the vicinity of the host vehicle 1.

Previous research has shown that road vehicle drivers are able avoid most types of accidents if they have a high level of attention at least two seconds before a critical situation arise. Thus, in some additional embodiments the at least one processing device 2 is further programmed to produce the at least one of visual, acoustic or haptic information to a host vehicle driver environment, to promote increased host vehicle driver-attention in a direction from which the at least one hypothetical threat may arise, if the estimated time remaining until the estimated host vehicle driver level of attention is required is less than the threshold-time $t_{thres}$.

However, it should be noted that in some situations, defensive steering/braking actions by the host vehicle 1 may be continuously required, e.g. during the last two seconds when passing a stationary vehicle where pedestrians suddenly might appear from an obscured area at any point in time. Thus, the at least one processing device 2 may further be programmed to perform such when required.

In yet some further embodiments the system is designed to provide for individually estimating when a high level of attention is required using a driver model with estimated individual reaction times for different potential threats, lighting, weather, and road conditions and threat looming rates and similar. Thus, in such embodiments the at least one processing device 2 is further programmed to estimate the time until the estimated host vehicle driver level of attention required to handle the at least one hypothetical threat will be required using a driver model with estimated reaction times for different potential threats.

Also, here envisaged is a road vehicle 1 comprising a system as described above.

In the following will be described some examples of traffic scenarios where the proposed solutions will be beneficial.

Assume that a driver of a road vehicle 1 is driving on an empty commuting route with single way traffic and there are no objects present that may obstruct the view. In this environment, there are no "what ifs" that will require the driver to keep a high level of attention and hence it is safe to have a normal level of attention as long as the vehicle 1 is not starting to deviate from the centre of the lane.

Assume instead that a driver is driving in a neighbourhood with cars parked next to the road, where there might be children playing in the area. Then the required level of attention is high, at least every time the vehicle 1 passes a parked car potentially obscuring a playing child. The required level of attention is even higher if the driver speeds up since this will reduce the required reaction time. If the driver is speeding up further, the required reaction time may get dangerously low and even negative, implying that the driver shall be encouraged to slow down, which either can be done automatically through triggered braking (inattention shield) or through visual/acoustic/haptic information to the driver to encourage driver-initiated braking of the road vehicle 1.

When the above method or system is used for the adaptation of active safety systems, a more appropriate intervention timing and intervention inhibit can be determined when assisting distracted road vehicle drivers. In essence, a driver is not warned too early in situations where only a low level of attention is required and informed earlier if the driver is distracted in situations where a high level of attention is required.

In still yet an additional embodiment, the method and system are operable for detecting and adequately warning a driver that is determined to be of a unique out-of-the-loop class of drivers that mistakenly believe that a road vehicle operating in a driver-assist or self-driving (i.e., piloted-driving) mode will automatically identify and react to a perceived or sudden threat. This situation requires a systematic analysis and classification of the behavior of a given driver and a higher level of coaching and warnings for this unique class of drivers. The above methodologies utilize one inattentiveness threshold for all drivers, however this implementation utilizes a second threshold for out-of-the-loop drivers, as determined by different eye movement characteristics and the like. Such drivers are provided with earlier and/or enhanced warnings as a heightened need for intervention exists, especially in view of potential time-to-collision probabilities.

In this embodiment, eye movement plus other complimentary information, such as touchscreen use, other driver activity, seat recline status, etc., are used to detect an out-of-the-loop driver. Here, eye movement is not simply assessed relative to time and focus, but is also assessed relative to the threat assessment that has been made by the road vehicle. Out-of-the-loop drivers tend to have long eye glances (e.g., 1-40 seconds) and ignore warnings. Thus, these eye glances may be patterned and summarized with a buffer. Time looking at the road and time looking away from the road may be integrated over time, for example, with time looking at the road credited and time looking away from the road debited. In this manner, patterns may be established and rules may be established to detect an out-of-the-loop driver. Current methodologies analyze only "distracted" or "not distracted" at an instant in time. The present methodology analyzes a pattern of behavior and establishes a probability that a given driver is out-of-the-loop or not. This methodology is illustrated conceptually in FIG. 3. This out-of-the-loop detection pattern over time is exemplified as a buffer, but additional alternatives for pattern detection may also be implemented. Alternative pattern quantifications are exceedance of safe attention behavior rules, such as inappropriate off-path (or off-threat) long glance durations, inappropriate on-path (or on-threat) short glance durations, and the detection of a series of on-and-off glances over a window of time such as 6 s, 30 s, 60 s, or minutes. These patterns can be compared to reference patterns of attentive and skilled driver eye movement to determine inappropriateness. These reference patterns can be determined for different driving contexts, such as day/night, road curvature, friction levels, type of traffic environment (e.g. traffic density), different speeds, road types (motorway, rural roads, city driving, proximity to intersections, etc.). Reference patterns can also be adapted to individual differences, such as eye and facial features, and medical problems (e.g. strabismus), all of which impact eye movement patterns. Essentially, inappropriateness is determined for an individual in a driving context for a pattern over time or in response to a prompt, such as a warning.

Figure 3:
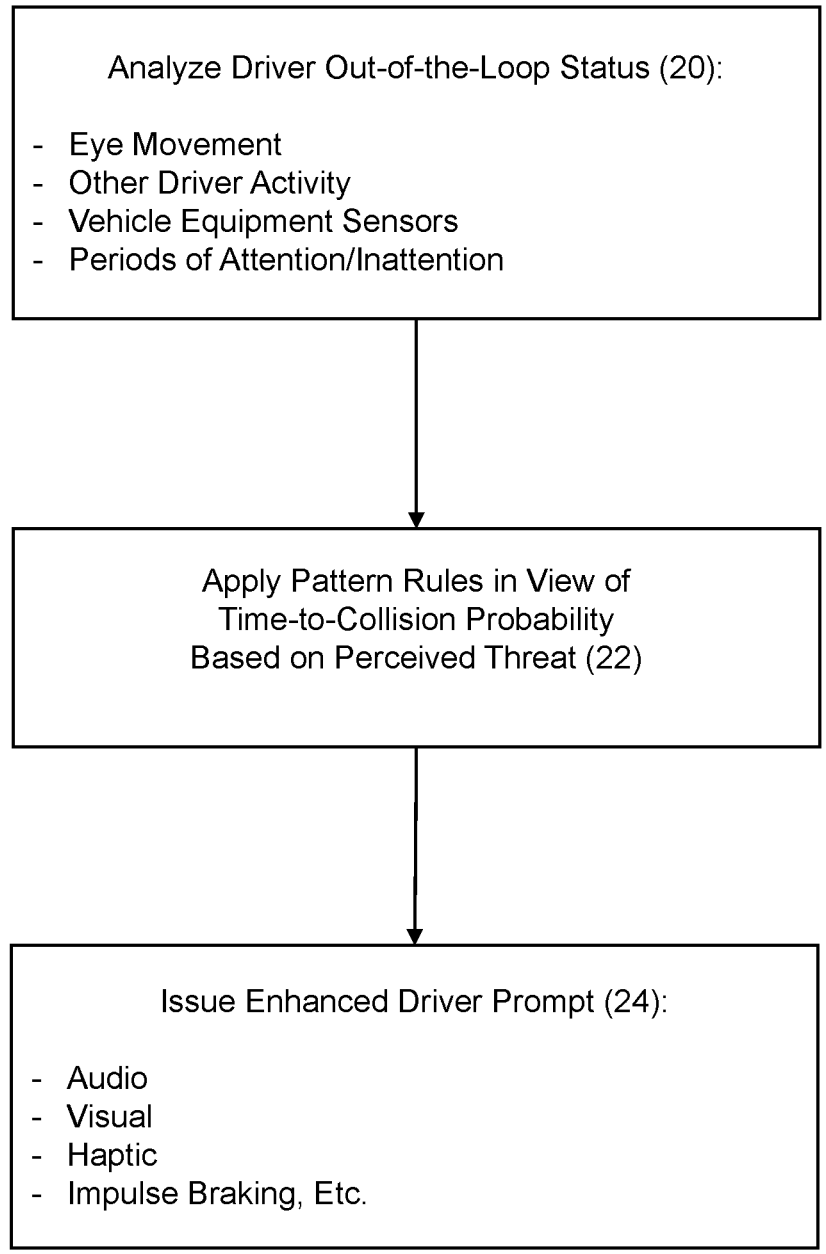
FIG. 3 illustrates schematically another method for assisting a driver of a host vehicle to drive with precaution according to an example embodiment.

Thus, in FIG. 3, the method includes analyzing the driver's out-of-the-loop status via the analysis of sensory data as provided above, including eye movement, other driver activity, data from vehicle sensors, periods of attention/inattention, etc. 20. As before, pattern rules are applied in view of a time-to-collision probability based on a perceived threat, although now out-of the-loop status is also factored in 22. Because the driver is out-of-the-loop, an enhanced driver prompt is now issued, such as an audio prompt, a visual prompt, a haptic prompt, impulse barking/steering, etc. 24.

Figure 4:
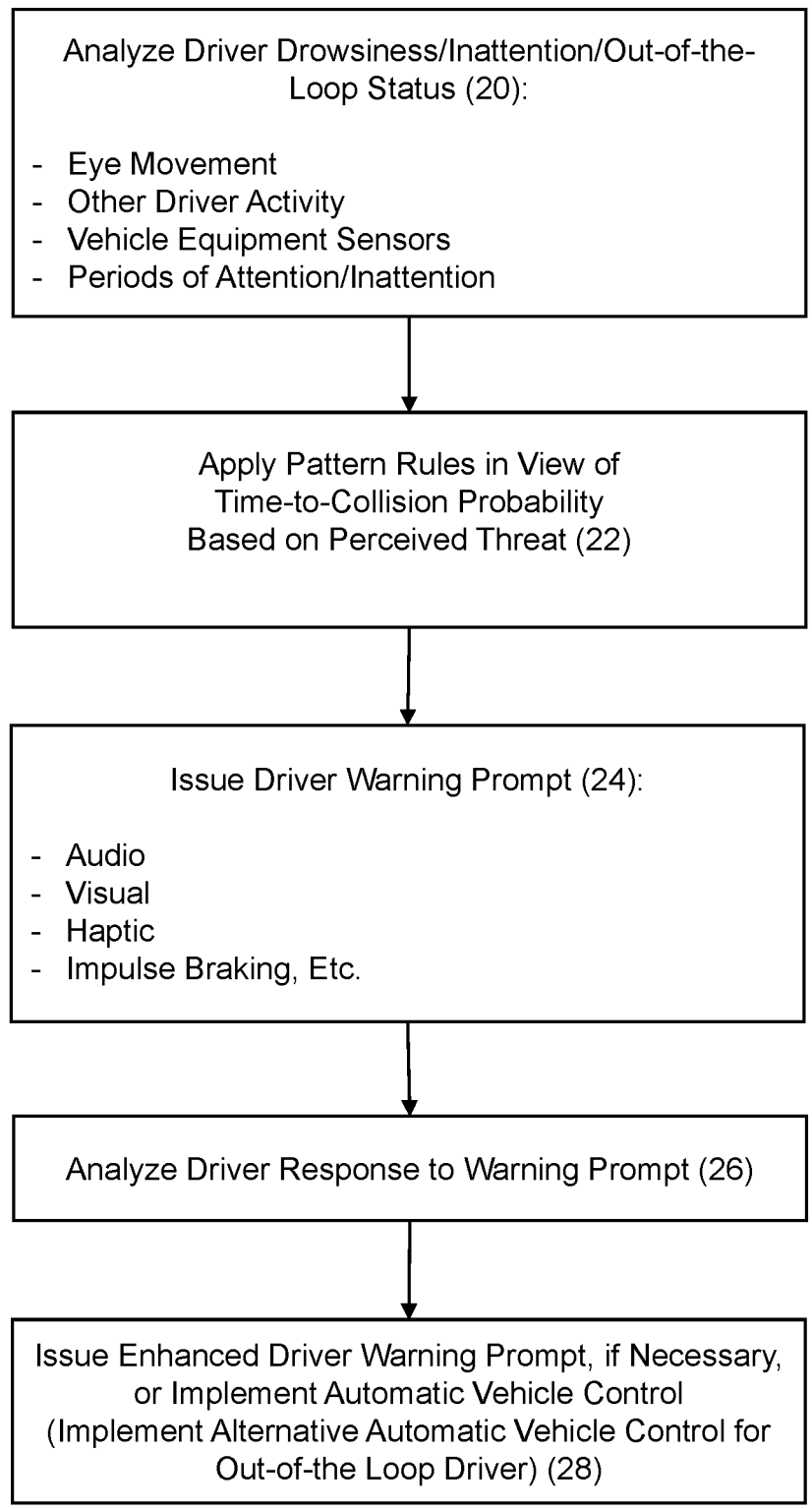
FIG. 4 illustrates schematically yet another method for assisting a driver of a host vehicle to drive with precaution according to an example embodiment.

As illustrated in FIG. 4, the method can further include analyzing the driver response to this enhanced driver prompt 26 and, if an adequate response is not detected, issuing a further enhanced driver prompt or, if necessary, implementing automatic vehicle control 28.

In still yet an additional embodiment, the method and system are operable for detecting and adequately warning an inattentive, drowsy, and/or out-of-the-loop driver and assessing and confirming the driver's adequate response to the associated warning prompt(s), which may include audio, visual, haptic, and, more preferably, brake pulse or the like warning prompt(s). This situation requires a modeling of reaction times and a consideration of time-to-collision probabilities once a perceived or sudden threat has been identified. After an inattentive, drowsy, and/or out-of-the-loop state has been detected and warning prompt(s), which may include audio, visual, haptic, and, more preferably, brake pulse or the like warning prompt(s), have been issued, the driver's response to the warning, the road, and/or the precautionary event is assessed. The system models response times and compares these against those observed, balancing this against a time-to-collision probability with the starting time chosen to be the precautionary event or warning. Based on warning success and driver response, subsequent warning prompts may be given and/or controlled vehicle response may be initiated. This methodology is again illustrated conceptually in FIG. 4. The point is that once an out-of-the-loop driver is detected, the driver can be warned (in various modalities) and/or an alternative vehicle control algorithm can be implemented. The alternative vehicle control algorithm could be a more imprecise control of steering and braking (if the vehicle is operating in a driver-assist or self-driving (i.e., piloted-driving) mode). Imprecise control can include introducing erratic steering or braking behaviors, or introducing a "dead-band" of no control in the 1-2 foot section in the center of the lane, or introducing a non-smooth continuous braking behaviour, for example.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method for assisting a driver of a host vehicle to drive with precaution, coincident with or after determining from one or more host vehicle sensors or cameras arranged to monitor an environment of the host vehicle, other road users, and at least one particular feature associated with a traffic situation of the host vehicle, and applying at least one hypothesis related to at least one hypothetical threat that may arise based on the determined other road users and the at least one particular feature, the method comprising:

analyzing an out-of-the-loop condition of the host vehicle driver based on one or more of host vehicle driver eye movement, host vehicle driver activity, host vehicle equipment sensor data, and host vehicle driver periods of attention and inattention over a period of time prior to applying the at least one hypothesis related to the at least one hypothetical threat, wherein analyzing the out-of-the-loop condition of the host vehicle driver comprises identifying one or more of inappropriate off-path (or off-threat) long glance durations, inappropriate on-path (or on-threat) short glance durations, and detection of a series of on-and-off glances over a window of time and comparing observed glance patterns to reference patterns of attentive and skilled driver eye movements to determine appropriateness and inappropriateness of the observed glance patterns;

setting or estimating, based in part on the out-of-the-loop condition, a host vehicle driver level of attention threshold required to handle the at least one hypothetical threat and estimating a time until that host vehicle driver level of attention will be required;

deriving, from one or more host vehicle driver-monitoring sensors of the host vehicle, a current host vehicle driver level of attention;

determining if the set or estimated required host vehicle driver level of attention threshold exceeds the current host vehicle driver level of attention; and if the set or estimated required host vehicle driver level of attention threshold exceeds the current host vehicle driver level of attention, producing at least one of a visual, acoustic, haptic information, and brake impulse prompt to a host vehicle driver environment to promote increased host vehicle driver-attention to the at least one hypothetical threat and/or triggering at least one of automated braking and steering of the host vehicle to promote an increase in safety margin to the at least one hypothetical threat.

2. The method of claim 1, further comprising monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, providing at least one of an enhanced visual, acoustic, haptic information, and brake impulse prompt to the host vehicle driver.

3. The method of claim 1, further comprising monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, causing the host vehicle to automatically take a responsive action.

4. The method of claim 1, wherein analyzing the out-of-the-loop condition of the host vehicle driver comprises patterning and summarizing the host vehicle driver eye movement with a buffer.

5. The method of claim 4, wherein analyzing the out-of-the-loop condition of the host vehicle driver comprises integrating time looking at the road and time looking away from the road over time, with time looking at the road credited and time looking away from the road debited.

6. The method of claim 1, wherein the reference patterns are determined for different driving contexts.

7. The method of claim 1, wherein the reference patterns are adapted for individual differences.

8. A non-transitory computer-readable medium comprising instructions stored in a memory that, when executed by a processor, cause the processor to, after or coincident with determining from one or more host vehicle sensors or cameras arranged to monitor an environment of the host vehicle, other road users, and at least one particular feature associated with a traffic situation of the host vehicle, and applying at least one hypothesis related to at least one hypothetical threat that may arise based on the determined other road users and the at least one particular feature, perform the steps comprising:

analyzing an out-of-the-loop condition of the host vehicle driver based on one or more of host vehicle driver eye movement, host vehicle driver activity, host vehicle equipment sensor data, and host vehicle driver periods of attention and inattention over a period of time prior to applying the at least one hypothesis related to the at least one hypothetical threat, wherein analyzing the out-of-the-loop condition of the host vehicle driver comprises identifying one or more of inappropriate off-path (or off-threat) long glance durations, inappropriate on-path (or on-threat) short glance durations, and detection of a series of on-and-off glances over a window of time and comparing observed glance patterns to reference patterns of attentive and skilled driver eye movements to determine appropriateness and inappropriateness of the observed glance patterns;

setting or estimating, based in part on the out-of-the-loop condition, a host vehicle driver level of attention threshold required to handle the at least one hypothetical threat and estimating a time until that host vehicle driver level of attention will be required;

deriving, from one or more host vehicle driver-monitoring sensors of the host vehicle, a current host vehicle driver level of attention;

determining if the set or estimated required host vehicle driver level of attention threshold exceeds the current host vehicle driver level of attention; and if the set or estimated required host vehicle driver level of attention threshold exceeds the current host vehicle driver level of attention, producing at least one of a visual, acoustic, haptic information, and brake impulse prompt to a host vehicle driver environment to promote increased host vehicle driver-attention to the at least one hypothetical threat and/or triggering at least one of automated braking and steering of the host vehicle to promote an increase in safety margin to the at least one hypothetical threat.

9. The non-transitory computer-readable medium of claim 8, the steps further comprising monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, providing at least one of an enhanced visual, acoustic, haptic information, and brake impulse prompt to the host vehicle driver.

10. The non-transitory computer readable medium of claim 8, the steps further comprising monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, causing the host vehicle to automatically take a responsive action.

11. The non-transitory computer-readable medium of claim 8, wherein analyzing the out-of-the-loop condition of the host vehicle driver comprises patterning and summarizing the host vehicle driver eye movement with a buffer.

12. The non-transitory computer-readable medium of claim 11, wherein analyzing the out-of-the-loop condition of the host vehicle driver comprises integrating time looking at the road and time looking away from the road over time, with time looking at the road credited and time looking away from the road debited.

13. The non-transitory computer-readable medium of claim 8, wherein the reference patterns are determined for different driving contexts.

14. The non-transitory computer-readable medium of claim 8, wherein the reference patterns are adapted for individual differences.

15. A vehicle comprising a non-transitory computer-readable medium comprising instructions stored in a memory that, when executed by a processor, cause the processor to, coincident with or after determining from one or more host vehicle sensors or cameras arranged to monitor an environment of the host vehicle, other road users, and at least one particular feature associated with a traffic situation of the host vehicle, and applying at least one hypothesis related to at least one hypothetical threat that may arise based on the determined other road users and the at least one particular feature, perform the steps comprising:

analyzing an out-of-the-loop condition of the host vehicle driver based on one or more of host vehicle driver eye movement, host vehicle driver activity, host vehicle equipment sensor data, and host vehicle driver periods of attention and inattention over a period of time prior to applying the at least one hypothesis related to the at least one hypothetical threat, wherein analyzing the out-of-the-loop condition of the host vehicle driver comprises identifying one or more of inappropriate off-path (or off-threat) long glance durations, inappropriate on-path (or on-threat) short glance durations, and detection of a series of on-and-off glances over a window of time and comparing observed glance patterns to reference patterns of attentive and skilled driver eye movements to determine appropriateness and inappropriateness of the observed glance patterns;

setting or estimating, based on the applied at least one hypothesis and the out-of-the-loop condition, a host vehicle driver level of attention threshold required to handle the at least one hypothetical threat and estimating a time until that host vehicle driver level of attention will be required;

deriving, from one or more host vehicle driver-monitoring sensors of the host vehicle, a current host vehicle driver level of attention;

determining if the set or estimated required host vehicle driver level of attention threshold exceeds the current host vehicle driver level of attention; and if the set or estimated required host vehicle driver level of attention threshold exceeds the current host vehicle driver level of attention, producing at least one of a visual, acoustic, haptic information, and brake impulse prompt to a host vehicle driver environment to promote increased host vehicle driver-attention to the at least one hypothetical threat and/or triggering at least one of automated braking and steering of the host vehicle to promote an increase in safety margin to the at least one hypothetical threat.

16. The vehicle of claim 15, wherein the steps performed by the non-transitory computer readable medium further comprise monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, providing at least one of an enhanced visual, acoustic, haptic information, and brake impulse prompt to the host vehicle driver.

17. The vehicle of claim 15, wherein the steps performed by the non-transitory computer readable medium further comprise monitoring a host vehicle driver response to the at least one of a visual, acoustic, haptic information, and brake impulse prompt using one or more of host vehicle driver eye movement, host vehicle driver activity, host vehicle equipment sensor data, and host vehicle driver periods of attention and inattention over a period of time and, if the response falls below a predetermined threshold formulated using probability data, causing the host vehicle to automatically take a responsive action.

18. The vehicle of claim 15, wherein analyzing the out-of-the-loop condition of the host vehicle driver comprises patterning and summarizing the host vehicle driver eye movement with a buffer.

\* \* \* \* \*